Dec. 13, 1955  H. B. BARRETT  2,726,453

BRAKE PEDAL CLEARANCE GAUGES

Filed Nov. 10, 1952

INVENTOR.
HARRY B. BARRETT
BY
*Alfred W. Heistaff*
ATTORNEY

United States Patent Office 2,726,453
Patented Dec. 13, 1955

2,726,453
BRAKE PEDAL CLEARANCE GAUGES

Harry B. Barrett, St. Louis, Mo.

Application November 10, 1952, Serial No. 319,756

4 Claims. (Cl. 33—168)

This invention relates in general to certain new and useful improvements in gauges and, more particularly, to a brake pedal clearance gauge adapted for use in conjunction with the testing of automotive brake pedals.

When the brake mechanism of a new automobile is originally checked and set at the factory or at the service station of the dealer selling the automobile, it is considered proper to adjust the mechanism so that the brake pedal, when in fully depressed position, will have approximately two to two and one-half inches of clearance between its underface and the floor board of the automobile. In other words, when the brake pedal is pressed down as far as it will go, there should still be approximately two inches of space between the brake pedal and the floor board to allow complete freedom of braking action. This is also necessary since the brake linings tend to wear in the course of ordinary use and the brake pedal clearance will gradually be decreased. The average motorist is not keenly aware of the condition of his brakes and frequently does not recognize that the amount of brake pedal clearance is inadequate for proper functioning of the brakes. Records of many automobile accidents reveal that the catastrophe was caused in whole or in part by improper functioning of the brakes of the vehicle. For this reason, many States require periodic mechanical inspections of automobiles and other similar vehicles. In such inspections, the condition of the brakes and particularly the amount of brake pedal clearance is one of the important aspects of the test. Heretofore, motor vehicle inspection officials, garage mechanics, and the mechanics in brake service stations have had considerable difficulty in accurately determining the amount of brake pedal clearance for the reason that no tool or gauge has been available which could be utilized for quickly and conveniently making this determination.

It is, therefore, the primary object of the present invention to provide a simple, inexpensive gauge which may be employed for determining the amount of brake pedal clearance in an automotive vehicle.

It is another object of the present invention to provide a gauge of the type stated which is compact, light in weight, and relatively inexpensive.

It is also an object of the present invention to provide a gauge of the type stated which can be quickly and simply applied to any automotive brake pedal and will afford an immediate objective determination showing that the amount of brake pedal clearance is adequate and satisfactory for the proper functioning of the automotive braking system being inspected.

With the above and other objects in view, my invention resides in the novel features of form, construction, arrangement, and combination of parts presently described and pointed out in the claims.

In the accompanying drawing—

Figure 1:
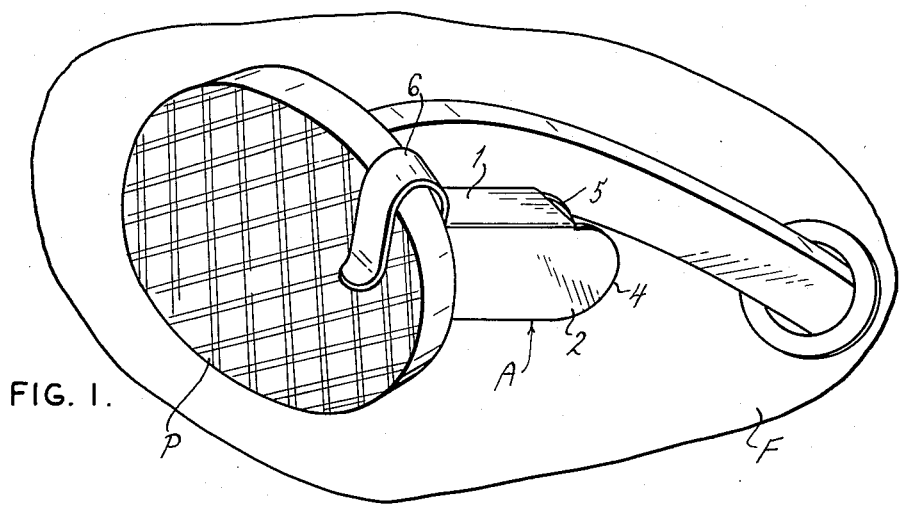
Figure 1 is a fragmentary perspective view of an automobile floor board and the brake pedal located operatively therein, illustrating the attachment to the brake pedal of a brake pedal clearance gauge constructed in accordance with and embodying the present invention.
Figure 2:
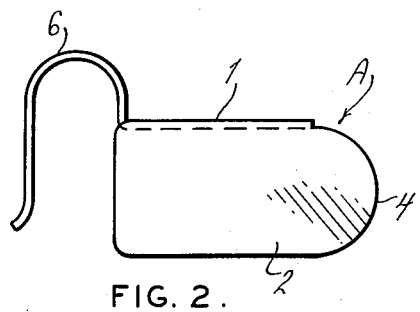
Figure 2 is a side elevational view of the brake pedal clearance gauge of the present invention.
Figure 3:
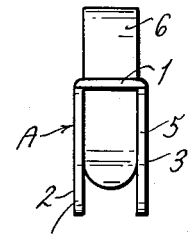
Figure 3 is an end elevational view of the brake pedal clearance gauge.
Figure 4:
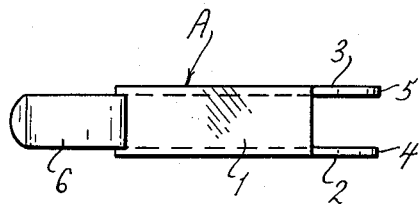
Figure 4 is a top plan view of the brake pedal clearance gauge.

Referring now in more detail and by reference characters to the drawing, which illustrates a preferred embodiment of the present invention, A designates a brake pedal clearance gauge comprising a bight section 1 of oblong, rectangular shape, integrally joined along its longitudinal margins to opposed parallel side plates 2, 3, extending vertically downwardly therefrom and having identically shaped registering rear margins 4, 5, respectively, which are of substanitally semi-circular shape or contour. Also formed integrally with and extending upwardly from the forward transverse margin of the bight plate 1 is a hook-like element attachment clip 6.

The brake pedal clearance gauge A is preferably stamped from sheet metal of suitable gauge and resiliency so that the attachment clip 6 will be relatively spring-like in character, but may still be manually bent or deformed so that it can be quickly and conveniently adjusted to slip over brake pedals of various different shapes, types, and thicknesses. It will, of course, be understood in this connection that the brake pedal clearance gauge A may be formed as a stamping or may, if desired, be cast from aluminum and even may be fabricated from certain types of synthetic resin materials, although in the latter case the ability of the device to fit various different types of brake pedals will, of course, be limited to the inherent resiliency and flexibility of the material, because ordinarily materials of this latter type cannot be manually deformed without cracking or breaking. In use, the brake pedal clearance gauge A may be slipped over the brake pedal P, substantially in the manner as shown in Figure 1 with the curved margins 4, 5, presented rearwardly and downwardly toward the floor board F. Thereupon, either the inspecting official can step on the brake pedal himself or the driver of the vehicle can be instructed to do so. If the pedal can be depressed far enough so that the rearwardly presented arcuate margins 4, 5, strike against the upwardly presented face or surface of the floor board F, the amount of clearance in the braking system is not sufficient and the brakes need adjusting. On the other hand, a properly adjusted set of brakes will have sufficient brake pedal clearance so that the brake pedal P cannot be pressed down far enough to bring the arcuate margins 4, 5, of the brake pedal clearance gauge A into contact with the floor board F and this condition can be readily determined by visual inspection or by touch since the existence of some space between the margins 4, 5, and the floor board F will be immediately apparent. It, of course, will be understood that the horizontal length of the side plates 2 has been selected to provide a distance of approximately two inches which is considered to be the minimum amount of necessary brake pedal clearance. If, for any reason, greater or smaller clearance should be required, as might conceivably be the case with specially designed brake systems in custom built automobiles or something of that sort, the size of the brake pedal gauge A may be appropriately modified. Actually, a brake pedal clearance gauge A having a two-inch clearance dimension is universally suitable for all standard types of automobiles currently in use in this country.

When the inspection has been completed, the brake pedal gauge, of course, can be quickly removed and, because of its light weight and compact size, readily carried by the inspection official or service mechanic in his pocket or tool kit. As has been above indicated, various different types of automobiles employ brake pedals of varying thicknesses and to meet this situation the inspection official or service mechanic can readily bend the attachment clip 6 with his fingers to fit whatever thickness may be encountered.

It should be understood that changes and modifications in the form, construction, arrangement, and combination of the several parts of the brake pedal clearance gauge may be made and substituted for those herein shown and described without departing from the nature and principle of my invention.

Having thus described my invention, what I claim and desire to secure by Letters Patent is:

1. A brake pedal clearance gauge comprising a rectangular body member provided along oppositely presented parallel margins with depending parallel side plates having co-planar transverse end faces adapted for abutment against the under face of a brake pedal and semi-circular opposite end faces adapted for contact against the opposing area of the floorboard of an automobile in which the brake pedal is operatively mounted, the end faces of each plate being spaced from each other by a predetermined distance, and means for securing the body member to the brake pedal with one end face of each plate held in snug-fitting abutting engagement against the under face of the brake pedal.

2. A brake pedal clearance gauge comprising a rectangular body member provided along oppositely presented parallel margins with depending parallel side plates having co-planar transverse end faces adapted for abutment against the under face of a brake pedal and semi-circular opposite end faces adapted for contact against the opposing area of the floor board of an automobile in which the brake pedal is operatively mounted, the end faces of each plate being spaced from each other by a predetermined distance, and a hook-like member forming a part of the body member and projecting outwardly therefrom for removable engagement with the brake pedal whereby to hold the body member in operative position against the under face thereof.

3. A brake pedal clearance gauge comprising a rectangular body member provided along oppositely presented parallel margins with depending parallel side plates having co-planar transverse end faces adapted for abutment against the under face of a brake pedal and semi-circular opposite end faces adapted for contact against the opposing area of the floorboard of an automobile in which the brake pedal is operatively mounted, the end faces of each plate being spaced from each other by a predetermined distance, and a manually deformable hook-like member forming a part of the body member and projecting outwardly therefrom for removable engagement with the brake pedal whereby to hold the body member in operative position against the under face thereof.

4. A brake pedal clearance gauge comprising a rectangular body member provided along oppositely presented parallel margins with depending parallel side plates having co-planar transverse end faces adapted for abutment against the under face of a brake pedal and arcuate opposite end faces adapted for contact against the opposing area of the floorboard of an automobile in which the brake pedal is operatively mounted, the end faces of each plate being spaced from each other by a predetermined distance, and a manually deformable hook-like member forming a part of the body member and projecting outwardly therefrom for removable engagement with the brake pedal whereby to hold the body member in operative position against the under face thereof.

References Cited in the file of this patent

UNITED STATES PATENTS

| | | |
|---|---|---|
| 1,273,086 | Newell | July 16, 1918 |
| 1,583,585 | Emery | May 4, 1926 |
| 2,332,064 | Duffy | Oct. 19, 1943 |
| 2,349,742 | Macavoy | May 23, 1944 |